United States Patent [19]

Eschenbach

[11] Patent Number: 4,921,752

[45] Date of Patent: May 1, 1990

[54] LAMINATED SEAT FABRIC

[75] Inventor: Paul W. Eschenbach, Moore, S.C.

[73] Assignee: Milliken Research Corporation, Spartanburg, S.C.

[21] Appl. No.: 230,874

[22] Filed: Aug. 11, 1988

[51] Int. Cl.[5] .............................................. B32B 7/00
[52] U.S. Cl. ................................. 422/247; 422/230; 422/246; 422/253; 422/296; 422/423.1
[58] Field of Search .............. 428/252, 253, 246, 247, 428/296, 230, 231, 423.1

[56] References Cited

U.S. PATENT DOCUMENTS

| | | | |
|---|---|---|---|
| 3,016,318 | 1/1962 | Sudman | 428/252 |
| 3,127,306 | 3/1964 | Turton et al. | 428/196 |
| 3,576,703 | 4/1971 | Baker et al. | 428/253 |
| 3,759,776 | 9/1973 | Decker | 428/252 |
| 3,814,658 | 6/1974 | Decker | 428/252 |
| 4,104,430 | 8/1978 | Fenton | 428/253 |
| 4,296,967 | 10/1981 | Vogel | 297/451 |
| 4,443,511 | 4/1984 | Worden et al. | 428/253 |
| 4,527,832 | 7/1985 | McMains et al. | 297/355 |
| 4,541,885 | 9/1985 | Caudill, Jr. | 428/160 |
| 4,842,926 | 6/1989 | Sawa et al. | 428/253 |

FOREIGN PATENT DOCUMENTS

| | | | |
|---|---|---|---|
| 2220375 | 3/1973 | France | 428/253 |
| 0065186 | 4/1985 | Japan | 428/253 |
| 3028955 | 2/1988 | Japan | 428/253 |
| 0718406 | 11/1954 | United Kingdom | 428/253 |

Primary Examiner—James J. Bell
Attorney, Agent, or Firm—Earle R. Marden; H. William Petry

[57] ABSTRACT

A laminated fabric having a face layer of plush fabric, an intermediate layer of foam material and a bottom layer of scrim fabric having an elasticity of at least 100% in the warp and fill or course direction of the fabric.

4 Claims, 1 Drawing Sheet

U.S. Patent     May 1, 1990     4,921,752
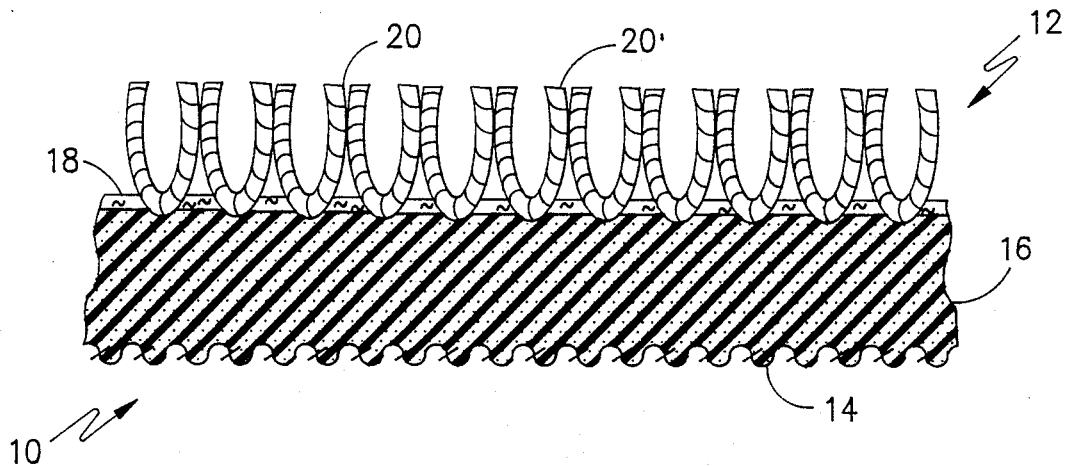
FIG. -1-
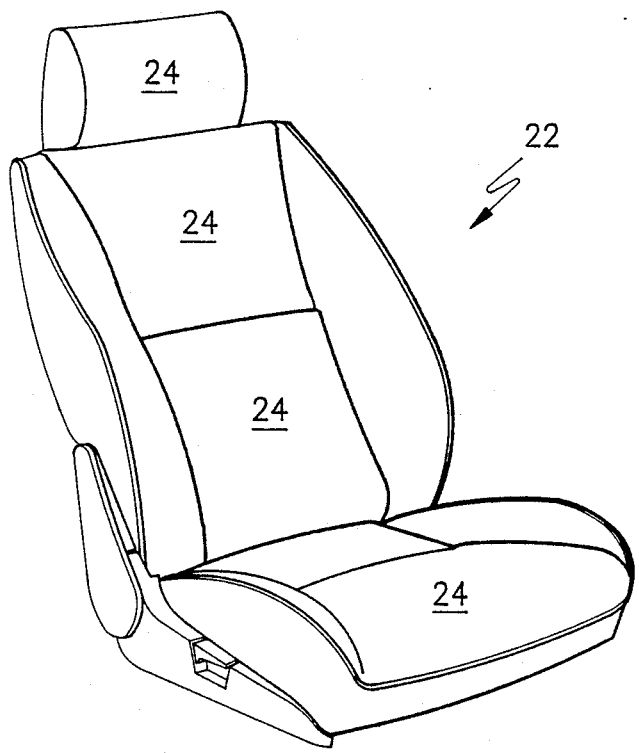
FIG. -2-

LAMINATED SEAT FABRIC

This invention relates to fabric for use on seats and in particular on automobile seats which require a plush surface to be used over long periods of time without loss of its aesthetic effect.

It is an object of the invention to provide a laminated seat fabric for automotive seats which will not cause the fabric layer to permanently crease or be depressed on the face side of such layer.

Other objects and advantages of the invention will become readily apparent as the specification proceeds to describe the invention with reference to the accompanying drawing, in which:

FIG. 1 is a cross-section view of the trilaminated fabric employed in the car seat shown in perspective in FIG. 2.

The fabric 10 consists of a plush face fabric 12 and a scrim fabric 14, both flame laminated to the intermediate foam core fabric 16. The flame lamination of the fabrics 12 and 14 to the core fabric 16 can be performed in a one step or a two-step operation.

The plush fabric 12 is a knit fabric made on a double plush warp knitting machine and slit to provide the desired fabric. The fabric 12 is preferably an all polyester fabric with the backing 18 being composed of 100/34 DuPont 56T textured polyester yarns, while the face fibers 20 in the pile are 100/54 DuPont T-57 flat Foy yarns. The fabric 12 is knit with 50 courses/inch and 25 wales/inch in the preferred form.

The foam core fabric 16 is preferably a commercially available polyurethane polyether type foam with a density of 1.7 pds./cubic ft.

The essential feature of the invention is the scrim 14 which has to have an elasticity in both the warp and fill or course direction of at least 100%. In the preferred form of the invention the scrim 14 is a polyester jersey knit, knit with 70/34 DuPont 56-T textured polyester yarn. It should be understood that the scrim 14 can be knit woven or non-woven so long as it has the required elasticity and does not cause or allow the face fabric to crease and/or form depressions therein when formed into a structure such as comfort and supporting structures of a car seat 22.

The car seat 22 shown in FIG. 2 can have a number of panels 24 of fabric 10 which are cut and sewn into position or molded as an integral unit. In the formation of these panels or after continuous use for a period of time, the panels 24 are bent upwardly forming a concave cavity therein which tends to crease or form indentions therein. This bending during molding and/or use many times exceeds an angle of 45° and it has been found that the use of a scrim fabric 14 having an elasticity in excess of 100% in both the warp and fill or course direction that basically eliminates the problem..

Although the preferred embodiment of the invention has been described, it is contemplated that changes ma be made without departing from the scope or spirit of the invention and it is desired that the invention be limited only by the claims.

I claim:

1. A trilaminated fabric for use in car seats comprising: a polyurethane core fabric, a plush fabric laminated to one side of said core fabric and an elastic scrim fabric laminated to the other side of said core fabric, said elastic scrim fabric having an elasticity at least equal to 100% in both the warp and fill directions of the fabric.

2. The fabric of claim 1 wherein said scrim fabric is a jersey knit.

3. The fabric of claim 2 wherein said scrim fabric is substantially all polyester.

4. The fabric of claim 3 wherein said plush fabric is substantially all polyester.

* * * * *